(12) United States Patent
Xu et al.

(10) Patent No.: US 8,622,087 B2
(45) Date of Patent: Jan. 7, 2014

(54) CONTROL VALVE

(75) Inventors: Xiao-Bing Xu, Shenzhen (CN);
Qing-Song Wen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 13/099,384

(22) Filed: May 3, 2011

(65) Prior Publication Data

US 2012/0104302 A1 May 3, 2012

(30) Foreign Application Priority Data

Oct. 28, 2010 (CN) .......................... 2010 1 0523071

(51) Int. Cl.
*F16K 11/07* (2006.01)
(52) U.S. Cl.
USPC ....... 137/625.69; 251/252; 251/257; 251/258
(58) Field of Classification Search
USPC ........... 137/625.25–625.69; 251/31, 251–261
See application file for complete search history.

(56) References Cited

U.S. PATENT DOCUMENTS

| | | | | |
|---|---|---|---|---|
| 2,506,063 A | * | 5/1950 | Carbon | 251/263 |
| 2,796,886 A | * | 6/1957 | Whitlock, Jr. | 137/893 |
| 2,903,233 A | * | 9/1959 | Magor | 251/3 |
| 3,324,886 A | * | 6/1967 | Way | 137/625.48 |
| 3,507,475 A | * | 4/1970 | Davis et al. | 251/120 |
| 3,645,295 A | * | 2/1972 | Nowak et al. | 137/624.13 |
| 3,819,148 A | * | 6/1974 | Cole et al. | 251/252 |
| 4,126,293 A | * | 11/1978 | Zeuner et al. | 251/30.01 |
| 4,544,132 A | * | 10/1985 | Allen et al. | 251/318 |
| 2012/0080633 A1 | * | 4/2012 | Xu | 251/326 |

* cited by examiner

*Primary Examiner* — John Rivell
*Assistant Examiner* — Matthew W Jellett
(74) *Attorney, Agent, or Firm* — Altis Law Group, Inc.

(57) ABSTRACT

A control valve includes a valve body, a valve plug, two adjusting elements and two operating members. The valve body has a valve hole defined through the valve body and further defines an inlet hole and two outlet holes respectively communicating with the valve hole. The valve plug is movably assembled within the valve body. Two ends of the valve plug are respectively exposed to the outside of the valve body. The two adjusting elements are respectively mounted to two ends of the valve body and respectively adjustably resist against two ends of the valve plug. The two operating members are respectively fixed to the two adjusting elements for driving the two adjusting elements to move the valve plug within the valve hole of the valve body, and thereby controlling the control valve to switch between an open state and a closed state.

13 Claims, 6 Drawing Sheets

US 8,622,087 B2

CONTROL VALVE

BACKGROUND

1. Technical Field

The present disclosure relates to control mechanisms, and particularly, to a control valve.

2. Description of Related Art

Control valves are widely applied in many fields such as hydraulic equipment, to control the flow of a liquid or gas. A commonly used control valve often includes two controls, which are switched during use, for controlling the supply to the hydraulic equipment. However, the commonly used control valve has a poor structure and is prone to switching between the two controls accidently, thereby generating a potential safety hazard to the hydraulic equipment.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the control valve. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
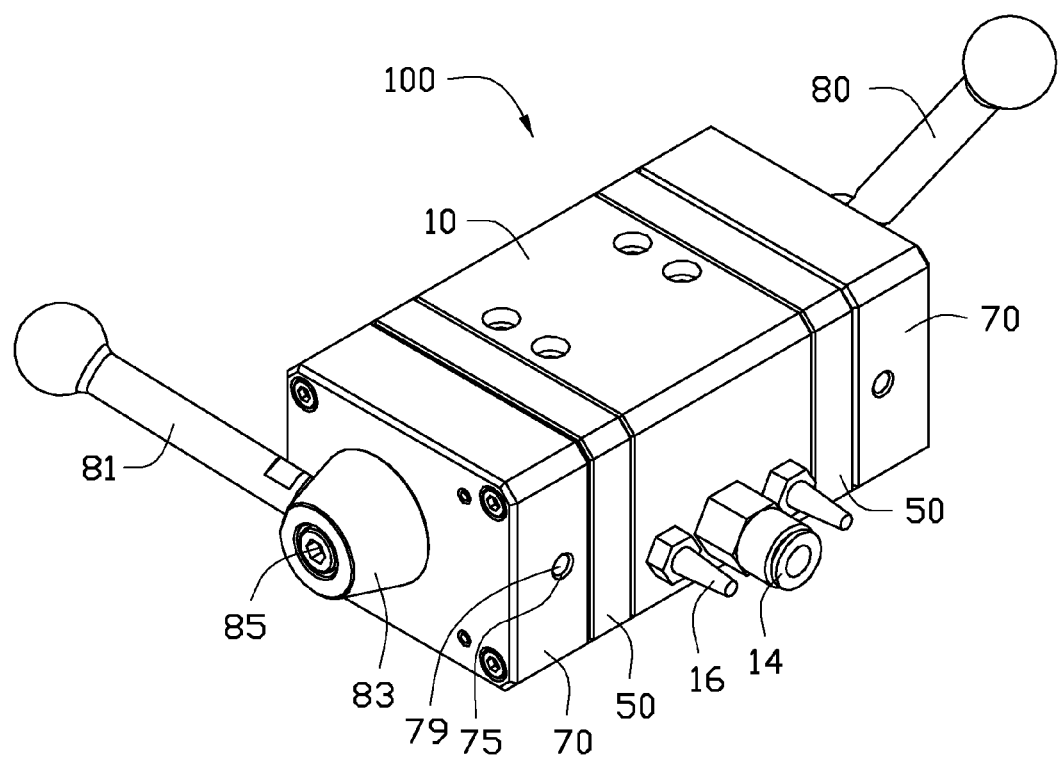
FIG. 1 shows an assembled isometric view of an embodiment of a control valve, wherein, the control valve includes a valve body, a valve plug, two clamping boards, two adjusting elements, two clamping covers, and two operating members.
Figure 2:
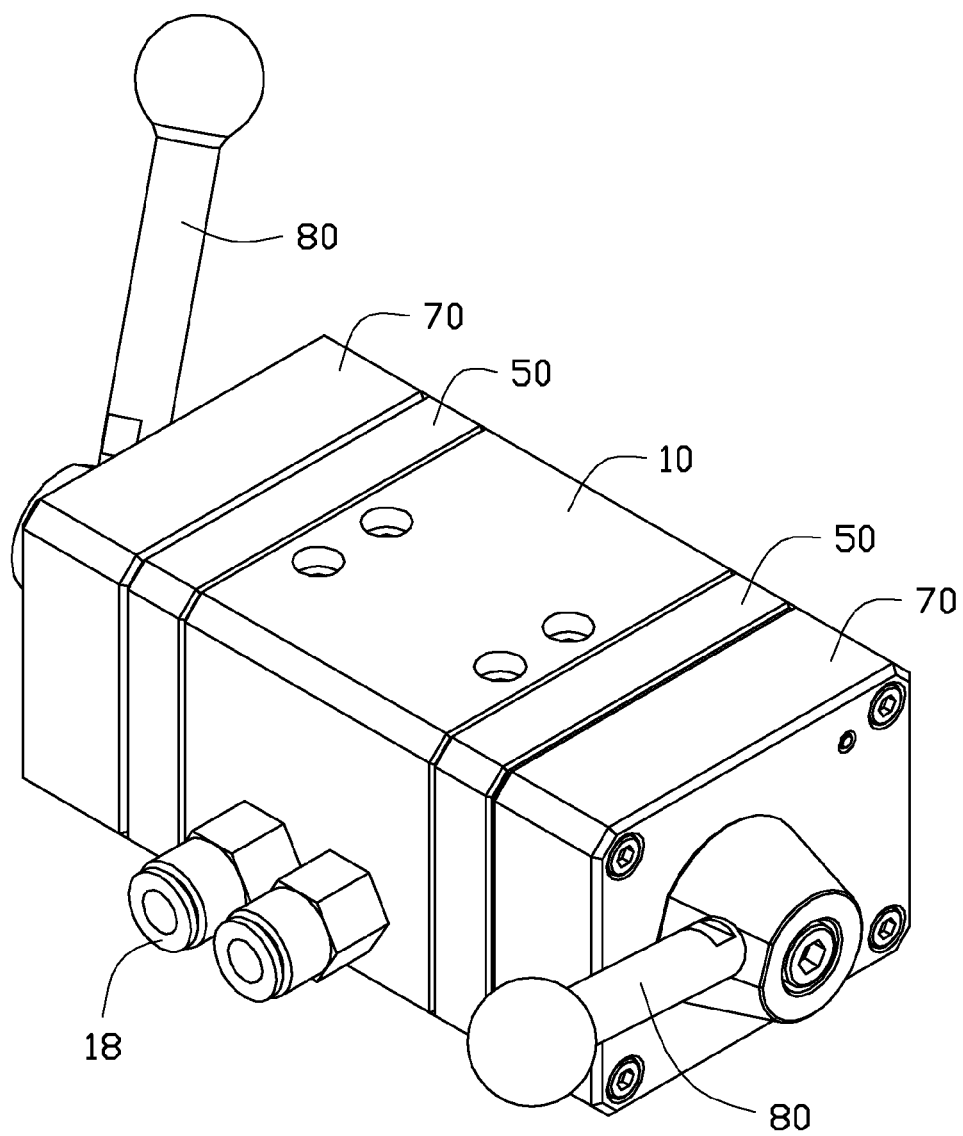
FIG. 2 is similar to FIG. 1, but viewed from another aspect.
Figure 3:
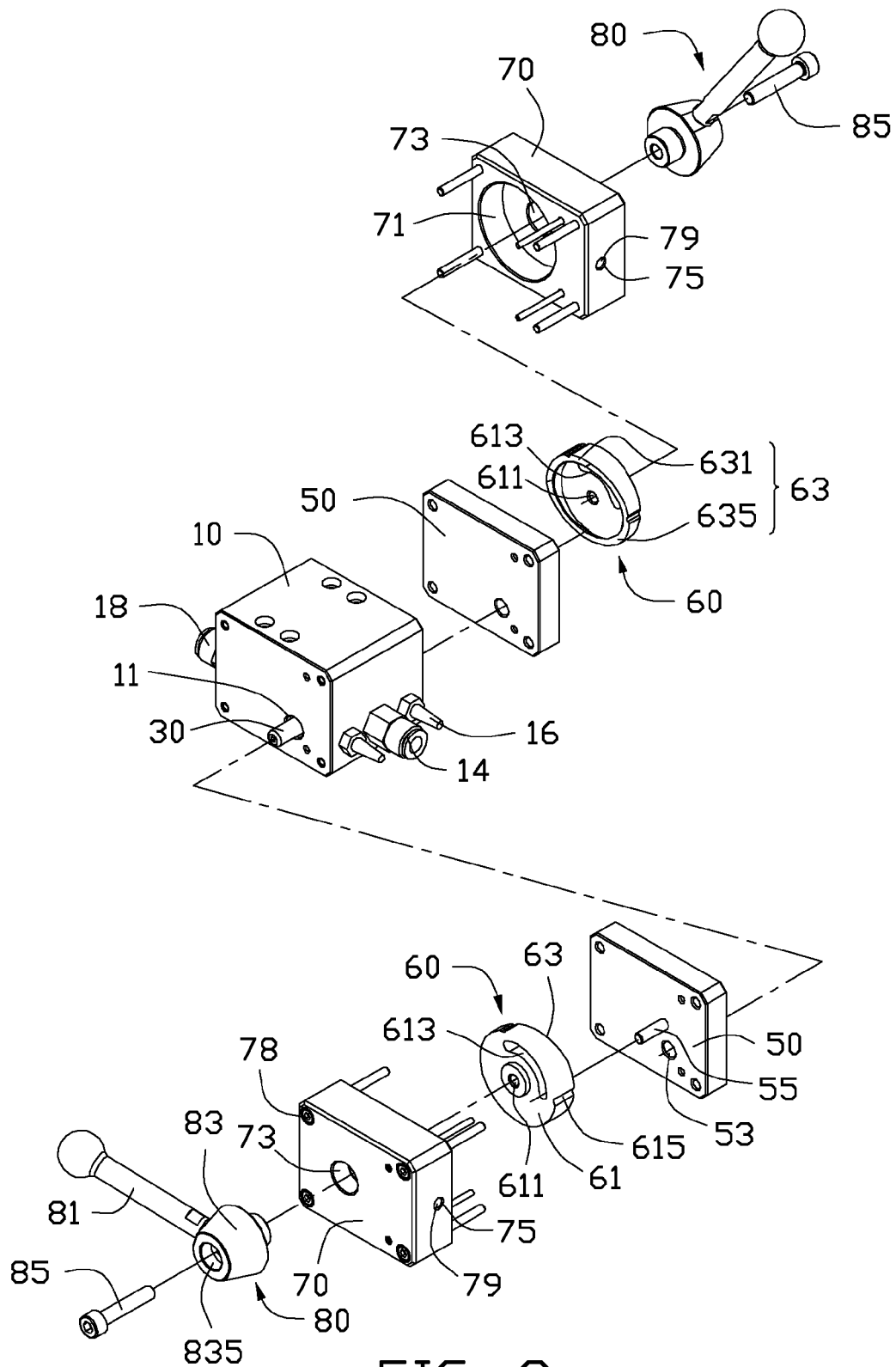
FIG. 3 shows an exploded, isometric view of the control valve shown in FIG. 1.

Referring to FIGS. 1 through 3, an embodiment of a control valve 100 includes a valve body 10, a valve plug 30, two clamping boards 50, two adjusting elements 60, two clamping covers 70, and two operating members 80. The valve body 10 is a hollow body. The valve plug 30 is movably or slidably assembled within the valve body 10. Two ends of the valve plug 30 are respectively exposed from two ends of the valve body 10. The two clamping boards 50 are respectively assembled to two ends of the valve body 10 and sleeved on two ends of the valve plug 30, thus, the valve body 10 is sandwiched between the two clamping boards 50. The two adjusting elements 60 together with the corresponding two clamping covers 70 are respectively mounted to the two clamping boards 50, and are adjustably assembled to two ends of the valve plug 30 for controlling the control valve 100 to switch between an open state and a closed state. The two operating members 80 are respectively assembled to the two clamping covers 70 and are respectively fixed to the two adjusting elements 60 to control the operation to the control valve 100.

Figure 4:
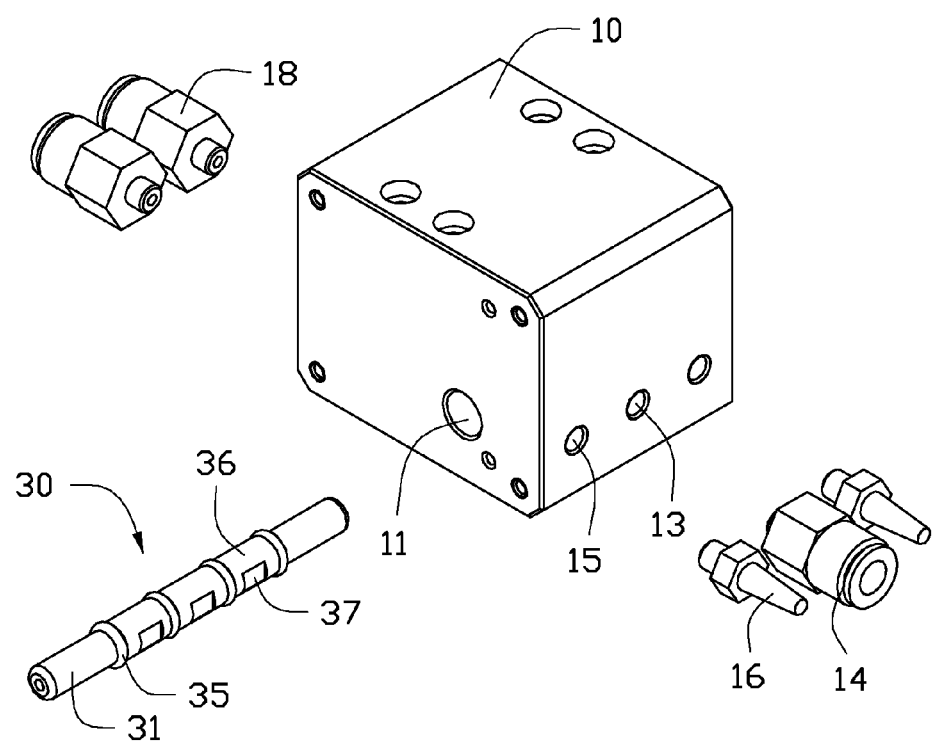
FIG. 4 shows a partial, exploded isometric view of the valve body and the valve plug of the control valve of FIG. 3.

Also referring to FIG. 4, the valve body 10 is substantially rectangular in the illustrated embodiment. A substantially cylindrical valve hole 11 is defined through the valve body 10 longitudinally. An air inlet hole 13 is defined in a substantially central portion of one sidewall (not labeled) of the valve body 10 and the air inlet hole 13 communicates with the valve hole 11. Two air escape holes 15 are separately defined in the sidewall of the valve body 10 to communicate with the valve hole 11 and are positioned at two sides of the air inlet hole 13. Referring to also FIG. 5, two air outlet holes 17 are separately defined in the opposite other sidewall (not labeled) of the valve body 10, and both air outlet holes 17 communicate with the valve hole 11. An air inlet connector 14 is assembled to the air inlet hole 13 for facilitating the connection of the air inlet hole 13 to an air inlet pipe (not shown). Two silencers 16 are respectively assembled to the two air escape holes 15. Two air outlet connectors 18 are respectively assembled to the two air outlet holes 17 for facilitating the connection of the two air outlet holes 17 a cylinder (not shown). In one embodiment, the distance between each of the two air escape holes 15 and the air inlet hole 13 is substantially the same as the distance between the two air outlet holes 17.

The valve plug 30 is substantially cylindrical with a shape substantially the same as that of the valve hole 11 of the valve body 10. The valve plug 30 is movably and slidably assembled within the valve hole 11 of the valve body 10. Two ends of the valve plug 30 are respectively exposed to the outside of the two ends of the valve hole 11 of the valve body 10. The valve plug 30 includes a valve shaft 31 and four sealing rings 35. The four sealing rings 35 are separately formed or sleeved on the valve shaft 31 along an axial direction of the valve shaft 31, thereby forming three adjacent cylindrical valve connecting sections 36 on the valve shaft 31. Each valve connecting section 36 defines two guiding slots 37 at two opposite sides of the valve connecting section 36 along the axial direction of the valve shaft 31. In one embodiment, a distance of every two adjacent sealing rings 35 is substantially the same as the distance of the two air outlet holes 17 of the valve body 10.

The two clamping boards 50 are substantially rectangular board shaped, and respectively fixed to two ends of the valve body 10 and sleeved on two ends of the valve plug 30. Each clamping board 50 defines a sleeve hole 53 therethrough corresponding to the valve shaft 31. A guiding post 55 protrudes from a surface (not labeled) away from the valve body 10 and is positioned adjacent to the sleeve hole 53.

The two adjusting elements 60 are respectively adjustably mounted to two ends of the valve body 10, and are further respectively adjustably resisted against the two distal ends of the valve plug 30. The two adjusting elements 60 can adjust or control the valve plug 30 to slide within the valve hole 11 of the valve body 10, thereby switching the control valve 100 between an open state and a closed state. In the illustrated embodiment, the two adjusting elements 60 are two face cams, and are respectively mounted on the corresponding two clamping boards 50 away from the side of the valve body 10, and respectively resist against the two distal ends of the valve plug 30. Each adjusting element 60 includes a substantially cylindrical main body 61, and a cam portion 63 formed on a periphery of one end surface of the main body 61. A fixing hole 611 is axially defined through a substantially central portion of the main body 61. An arc guiding hole 613 is defined through the main body 61 axially corresponding to the guiding post 55 of the clamping board 50, and surrounds the outside of the fixing hole 611. Two limit slots 615 are separately defined in the periphery of the main body 61 and positioned adjacent to the corresponding two ends of the arc guiding hole 613. In the illustrated embodiment, a slope of the cam portion 63 after being unfolded can be less than 1:7, and in this embodiment, the slope is less than 1:8. The cam portion 63 includes a convex portion 631 and a concave portion 635 opposite to the convex portion 631.

The two clamping covers 70 are respectively fixed to the two clamping boards 50, and covered on the two adjusting elements 60. In the illustrated embodiment, the two clamping covers 70 are respectively fixed to the two ends of the valve body 10 via a plurality of fixing bolts 78 passing through the two corresponding two clamping boards 50. Each clamping cover 70 is substantially rectangular and includes a substantially cylindrical receiving cavity 71 defined in an end surface of the clamping cover 70 facing toward the clamping board 50, for receiving the corresponding adjusting element 60. A mounting hole 73 is defined through the bottom of the receiving cavity 71. A lock hole 75 is defined through one sidewall of each clamping cover 70 corresponding to the limit slot 615 of the adjusting element 60. A lock steel ball 79 is elastically assembled within the lock hole 75 of the clamping cover 70, for locking the adjusting element 60 at the two limit slots 615 relative to the clamping cover 70.

The two operating members 80 are respectively rotatably assembled to the two clamping covers 70, and respectively fixed to the corresponding two adjusting elements 60 via passing through the two clamping covers 70. In the illustrated embodiment, each operating member 80 includes a handle 81 and a hinge portion 83 formed at one distal end of the handle 81. A hinge hole 835 is defined through the hinge portion 83. A bolt 85 is passed through the hinge hole 835 of the hinge portion 83 and fixed to the adjusting element 60, such that the operating member 80 is fixed to the adjusting element 60.

During assembly of the control valve 100, the valve plug 30 is assembled within the valve hole 11 of the valve body 10, the two ends of the valve plug 30 are respectively oppositely exposed from two ends of the valve hole 11 of the valve body 10. The two clamping boards 50 are respectively assembled to two ends of the valve body 10 and sleeved on two ends of the valve plug 30, the two distal ends of the valve plug 30 respectively pass through the corresponding sleeve holes 53 of the two clamping boards 50. The two adjusting elements 60 are respectively adjustably mounted to two ends of the valve body 10, the cam portions 63 of the two adjusting elements 60 respectively resist against the two corresponding distal ends of the valve plug 30. The two guiding posts 55 of the two clamping boards 50 respectively align with and pass through the arc guiding holes 613 of the two adjusting elements 60. The two clamping covers 70 are respectively fixed to the two clamping boards 50 and covered on the corresponding two adjusting elements 60. The lock hole 75 of the clamping cover 70 aligns with one limit slot 615 of the corresponding adjusting element 60, and the lock steel ball 79 is elastically assembled into the lock hole 75 of the clamping cover 70. Finally, the two operating members 80 are respectively assembled to the two clamping covers 70, and are respectively fixed to the corresponding two adjusting elements 60 via the bolt 85 to finish the assembly of the control valve 100.

Figure 5:
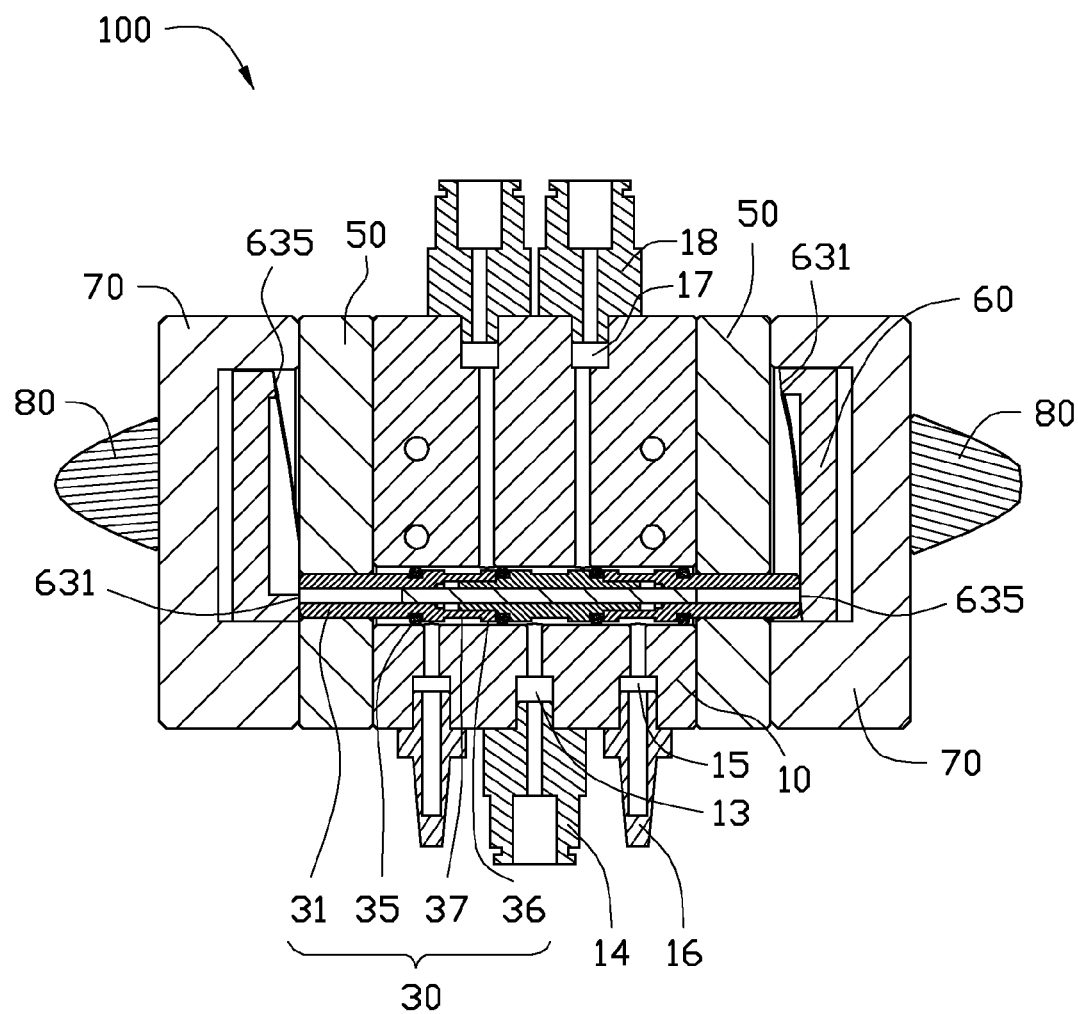
FIG. 5 shows a cross sectional view of the control valve in an open state.
Figure 6:
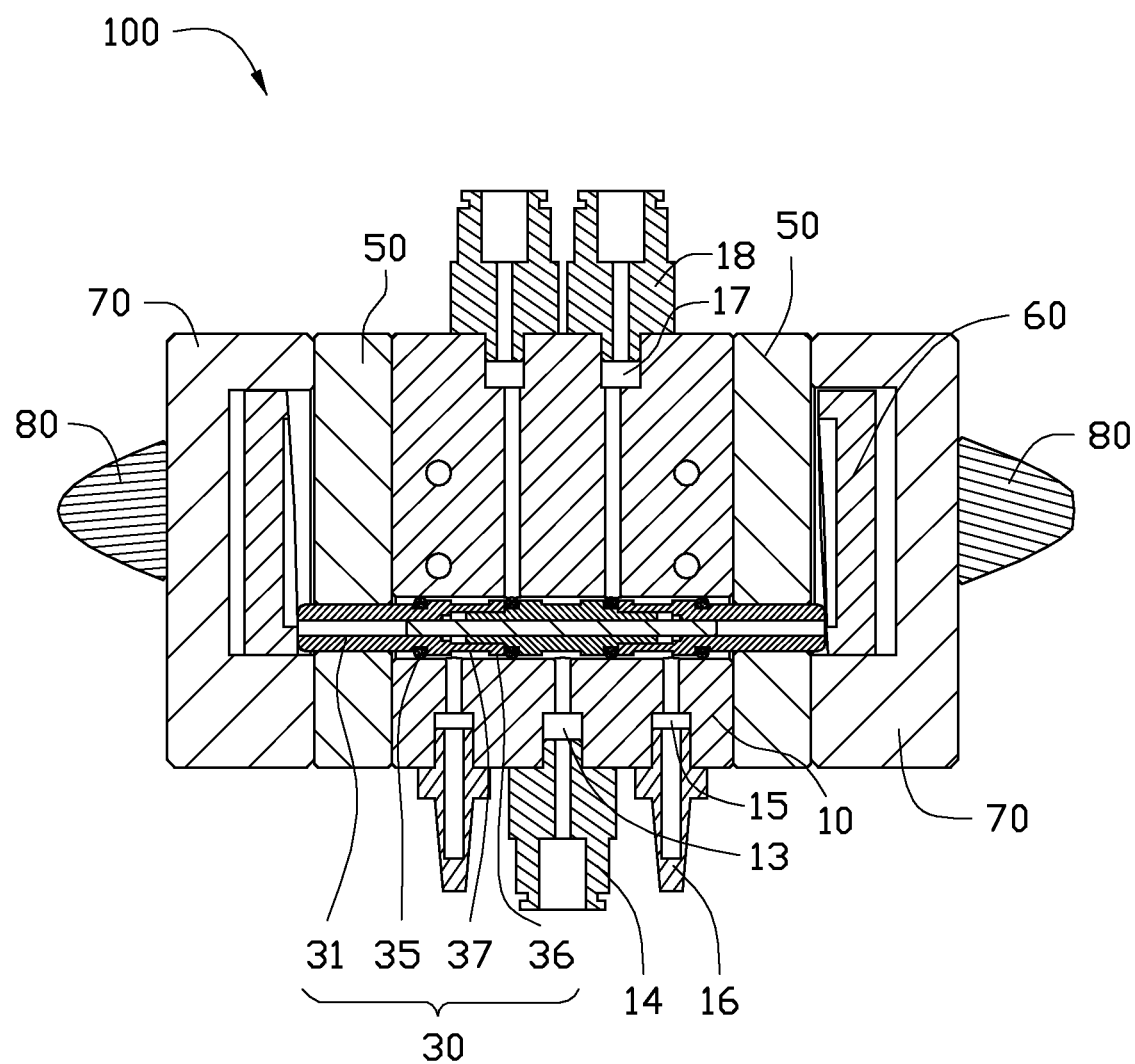
FIG. 6 is similar to FIG. 5, but shows the control valve in a closed state.

During use of the control valve 100, the air inlet hole 13 of the valve body 10 is connected to an inlet duct (not shown) via the air inlet connector 14, and the two air outlet holes 17 are connected to the cylinder (not shown) via two air outlet connectors 18. Referring to FIG. 5, as the control valve 100 is operating in an open state, the sealing rings 35 of the valve plug 30 is positioned aside of the air inlet hole 13 and the two air outlet holes 17. The air inlet hole 13 communicates with the two air outlet holes 17 via the guiding slots 37 of the valve plug 30, such that the gas can be inputted from the air inlet hole 13, and flows into the guiding slots 37 of the valve plug 30, and finally enters the cylinder through the two air outlet holes 17. When the control valve 100 needs to be turned off, the two operating members 80 are rotated to drive the corresponding two adjusting elements 60 to rotate along their arc guiding holes 613. Meanwhile, the valve plug 30 is resisted against to slide within the valve hole 111 of the valve body 10, until the middle two sealing rings 35 of the valve plug 30 are engaged into and plug up the two air outlet holes 17 as shown in FIG. 6. The control valve 100 is thereby in a closed state. At this time, the air input from the air inlet hole 13 cannot flow into the cylinder via the two air outlet holes 17. The two silencers 16 positioned at two sides of the air inlet hole 13 are used to control the air pressure within the control valve 100.

The two clamping boards 50 can also be omitted, which at this time, the two adjusting elements 60 are directly assembled to two ends of the valve body 10 and resist against the two distal ends of the valve plug 30. The two clamping covers 70 are then covered over the two adjusting elements 60, and are respectively fixed to the two ends of the valve body 10.

The two clamping covers 70 can also be omitted, thus, the two operating members 80 are respectively and directly fixed to the two adjusting elements 60.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A control valve, comprising:
a valve body defining a valve hole therethrough and further defining an inlet hole and an outlet hole, the inlet hole and the outlet hole communicating with the valve hole;
a valve plug movably assembled within the valve body, two ends of the valve plug respectively being exposed to the outside of the valve body;
two clamping boards, wherein the two clamping boards are respectively fixed to two ends of the valve body and sleeved on two ends of the valve plug, each of the two clamping boards defines a sleeve hole therethrough corresponding to the valve plug, each of the two clamping boards comprises a guiding post protruding from a surface away from the valve body and positioned adjacent to the sleeve hole;
two adjusting elements, wherein two adjusting elements are two face cams, each of the two adjusting elements comprises a main body, and a cam portion formed on a periphery of one end surface of the main body, the main body is mounted to one distal end of the valve plug, the cam portion resists against the corresponding one distal end of the valve plug, the main body defines a fixing hole through a substantially central portion of the main body axially, and an arc guiding hole through the main body axially corresponding to the guiding post of each of the two clamping boards, the arc guiding hole surrounds at the outside of the fixing hole, the two guiding posts of the two clamping boards are respectively movably engaged into the corresponding two arc guiding holes of the two adjusting elements; and
two operating members respectively fixed to the two main bodies of the two adjusting elements through the fixing holes, for rotatably driving the two adjusting elements, thereby moving the valve plug within the valve hole of the valve body, and controlling the control valve to operate by switching between an open state and a closed state.

2. The control valve of claim 1, wherein the valve plug is substantially cylindrical with a shape substantially the same as that of the valve hole of the valve body, the valve plug comprises a valve shaft and four sealing rings separately formed or sleeved on the valve shaft, thereby forming three adjacent cylindrical valve connecting sections on the valve shaft; each valve connecting section defines a guiding slot for communicating the inlet hole with the outlet hole as the control valve operating in the open state.

3. The control valve of claim 1, wherein the control valve further comprises two clamping covers, and the two clamping covers are respectively fixed to the two clamping boards and cover the two adjusting elements.

4. The control valve of claim 3, wherein each clamping cover comprises a substantially cylindrical receiving cavity defined in an end surface of the clamping cover facing toward the clamping board, for receiving the corresponding adjusting element, each clamping cover further defines a mounting hole through the bottom of the receiving cavity; the two operating members are respectively assembled to and pass through the corresponding mounting hole and fixed to the adjusting element.

5. The control valve of claim 4, wherein each adjusting element defines two spaced limit slots in a periphery of the main body and positioned adjacent to the corresponding two ends of the arc guiding hole; each clamping cover defines a lock hole through one sidewall thereof corresponding to the limit slot of the adjusting element, and further comprises a lock steel ball elastically assembled within the lock hole of the clamping cover, for locking the adjusting element at the two limit slots relative to the clamping cover.

6. The control valve of claim 1, wherein the valve body further defines two air escape holes communicating with the valve hole and positioned at two sides of the inlet hole.

7. A control valve, comprising:
a valve body having a valve hole longitudinally defined through the valve body and further defining an air inlet hole and an air outlet hole at a periphery of the valve body to communicate with the valve hole, respectively;
a valve plug slidably assembled within the valve body, two ends of the valve plug respectively exposed to the outside of the valve body; and
two adjusting elements, each of the two adjusting elements comprising a main body and a cam portion formed on a periphery of one end surface of the main body; the cam portion comprising a convex portion and a concave portion opposite to the convex portion, the main body being mounted to one distal end of the valve plug, the cam portion maintaining resistance against the corresponding distal end of the valve plug, the two adjusting elements are rotated simultaneously and drive the valve plug to slide within the valve hole of the valve body, thereby controlling the control valve to switch between an open state and a closed state.

8. The control valve of claim 7, wherein the two adjusting elements are two face cams.

9. The control valve of claim 8, wherein the valve plug is substantially cylindrical with a shape substantially the same as that of the valve hole of the valve body, the valve plug comprises a valve shaft and four sealing rings separately formed or sleeved on the valve shaft, thereby forming three adjacent cylindrical valve connecting sections on the valve shaft; each valve connecting section defines a guiding slot for communicating the inlet hole with the outlet hole as the control valve operating in the open state.

10. The control valve of claim 7, wherein the control valve further comprises two clamping boards, the two clamping boards are respectively fixed to two ends of the valve body and sleeved on two ends of the valve plug; the two adjusting elements are respectively mounted to the two clamping boards and adjustably assembled to two ends of the valve plug.

11. The control valve of claim 10, wherein each clamping board defines a sleeve hole therethrough corresponding to the valve plug, each adjusting element defines a fixing hole through a substantially central portion of the main body axially; the control valve further comprises two operating members respectively fixed to the two adjusting elements for driving the two adjusting elements.

12. The control valve of claim 11, wherein each clamping board further comprises a guiding post protruding from a surface away from the valve body and positioned adjacent to the sleeve hole; each adjusting element defines an arc guiding hole through the main body axially corresponding to the guiding post of the clamping board, and the arc guiding hole surrounds at the outside of the fixing hole; the two guiding posts of the two clamping boards respectively movably engage into the corresponding two arc guiding holes of the two adjusting elements.

13. The control valve of claim 12, further comprising two clamping covers respectively fixed to the two clamping boards and cover the two adjusting elements.

\* \* \* \* \*